United States Patent
Hindley et al.

(10) Patent No.: US 8,742,382 B2
(45) Date of Patent: Jun. 3, 2014

(54) NEUTRON REFLECTOR BLOCK, SIDE REFLECTOR INCLUDING THE NEUTRON REFLECTOR BLOCK AND NUCLEAR REACTOR HAVING SUCH SIDE REFLECTOR

(75) Inventors: Michael Philip Hindley, Valhalla Pretoria (ZA); Christiaan Erasmus, Randburg (ZA)

(73) Assignee: Pebble Bed Modular Reactor Soc Ltd, Centurion (ZA)

( * ) Notice: Subject to any disclaimer, the term of this patent is extended or adjusted under 35 U.S.C. 154(b) by 0 days.

(21) Appl. No.: 13/701,991

(22) PCT Filed: Jun. 3, 2011

(86) PCT No.: PCT/IB2011/052437
§ 371 (c)(1),
(2), (4) Date: Jul. 1, 2013

(87) PCT Pub. No.: WO2011/151801
PCT Pub. Date: Dec. 8, 2011

(65) Prior Publication Data
US 2013/0270460 A1    Oct. 17, 2013

(30) Foreign Application Priority Data

Jun. 4, 2010 (ZA) .................... 2010/04028

(51) Int. Cl.
*G21K 1/00* (2006.01)

(52) U.S. Cl.
USPC ............ 250/505.1; 250/515.1; 250/517.1; 250/518.1; 376/220

(58) Field of Classification Search
USPC ............ 376/220; 250/505.1, 515.1, 517.1, 250/518.1
See application file for complete search history.

(56) References Cited

U.S. PATENT DOCUMENTS

2005/0220251 A1* 10/2005 Yokoyama et al. ........... 376/220

FOREIGN PATENT DOCUMENTS

DE        10104404 C1 *  4/2002  ............. G21C 11/06

* cited by examiner

*Primary Examiner* — Michael Maskell
(74) *Attorney, Agent, or Firm* — Thorpe North & Western LLP

(57) ABSTRACT

The invention relates to a neutron reflector block. The neutron reflector block comprises a first portion and a second portion. The first portion has a first end face and oppositely located intermediate shoulders which are spaced from the first end face. The first end face and the intermediate shoulders are bounded by spaced side faces and spaced upper and lower faces. The second portion protrudes from the first portion between the intermediate shoulders and has spaced side faces and spaced upper and lower faces. The second portion side faces are more narrowly spaced relative to the first portion side faces. The second portion also has a second end face located oppositely to the first end face.

23 Claims, 4 Drawing Sheets

NEUTRON REFLECTOR BLOCK, SIDE REFLECTOR INCLUDING THE NEUTRON REFLECTOR BLOCK AND NUCLEAR REACTOR HAVING SUCH SIDE REFLECTOR

THIS INVENTION relates to nuclear reactors. More particularly, the invention relates to side reflectors for high temperature gas cooled nuclear reactors. The invention provides for a neutron reflector block and for a neutron reflector block assembly. The invention extends to a side reflector including the neutron reflector block assembly and to a nuclear reactor having such a side reflector.

In high temperature gas cooled reactors, typically of the pebble bed type, core structures are structural components which are provided around the core and which define and maintain the geometry of a pebble bed which makes up the core. The core structures usually comprise two major components, namely core structure ceramics and a core barrel assembly. The core structure ceramics typically include a top reflector, a side reflector, and a bottom reflector. These reflectors are typically of a suitable neutron reflective material, usually graphite, and are in the form of blocks which are stacked in a vertical configuration, thereby forming columns. These columns are vertically supported by the core barrel assembly and laterally by means of lateral restraints. The reflectors mainly act to reflect neutrons back into the core so as to increase fissile activity in the core. When graphite is used as reflective material, the reflectors also act as neutron moderators. The present invention is directed particularly to the side reflector of the core structure ceramics and in particular, to the neutron reflector blocks of which it is made up.

Graphite blocks used as neutron reflector blocks in high temperature gas cooled nuclear reactors, particularly in side reflectors thereof, are exposed to extremely high temperatures and a fast neutron flux level. Exposure to these extreme conditions causes the graphite to shrink at first and then later to swell, leading to uneven internal stresses being generated in the graphite reflector blocks. Further, under these extreme conditions inherent material properties of the graphite are also prone to change. These additional inherent material property changes result in the internal stress distribution of the graphite blocks being unusually complicated and the behaviour of the blocks being counter-intuitive. In some cases, the internal stresses generated in the graphite blocks can exceed the strength of the graphite, causing the blocks to crack. These internal stresses may sometimes even cause the structural integrity of the block to be compromised. It is therefore imperative to limit the internal stresses which are generated in reflector blocks.

The Applicant is aware that one possible approach to limiting the generation of internal stresses in neutron reflector blocks is to limit or minimize the size of the blocks, thereby to limit the magnitude of the internal stresses generated inside the blocks. In such a case, the side reflector for a conventional core construction typically has to comprise two or more layers of reflector graphite, with the inner layer then having smaller blocks than the outer layer. It is, however, the Applicant's experience that the reduction in the size of the exposed blocks, i.e. those included in the inner layer, introduces other difficulties and disadvantages. One of these is that leak flow of gas through the side reflector may be increased due to the employment of an additional reflector layer, thus negatively impacting on the thermal efficiency of the reactor. Another disadvantage is that heat flow between the layers of blocks is decreased and leads to the passive cooling capacity of the core being reduced. In addition, the heat flow path constituted by the side reflector is interrupted due to the double-layer configuration and necessitates the provision of cooling to an inner side of the reflector blocks where temperatures are at a maximum and the effect of differential temperatures between the bulk of the block and a cooling channel is most severe. These differential temperatures again give rise to stress being generated in the reflector blocks, with the maximum attainable/operable difference in temperature therefore being limited by the strength of the material. This in turn limits the maximum temperature differential between cooling gas inlet and outlet temperature that has a direct influence on the efficiency of the entire plant.

The present invention seeks to provide a reflector block having good stress handling and reduced stress generation properties, and to preserve a heat flow path of the side reflector block whilst also reducing the stress which is experienced by the neutron reflector block.

In accordance with a first aspect of the invention, there is provided a neutron reflector block, which comprises a first portion having a first end face and oppositely located intermediate shoulders spaced from the first end face, the first end face and the intermediate shoulders being bounded by spaced side faces and spaced upper and lower faces; and a second portion, which protrudes from the first portion between the intermediate shoulders and has spaced side faces and spaced upper and lower faces, the second portion side faces being more narrowly spaced relative to the first portion side faces, and the second portion also having a second end face located oppositely to the first end face.

It will be appreciated that the second portion thus has a laterally narrowed profile in relation to the first portion.

The first and second portions of the reflector block may taper in width, i.e. in interfacial distance between side faces thereof, in a direction from the first end face towards the second end face. It will be appreciated that, when the reflector block portions so taper in width, positioning a plurality of similarly shaped reflector blocks in a side-by-side relationship in which they abut each other, typically with corresponding side faces of the first and second portions of respective adjacent reflector blocks being adjacent each other and the first portion side faces abutting each other, may result in the formation of a closed-shaped geometric arrangement of a sufficient number of the neutron reflector blocks. The number of reflector blocks required for the formation of such a closed-shape arrangement would, of course, typically depend on the angle at which the first and second portions of the reflector block are tapered.

At least one of the first and second portions may have a passage passing therethrough from its upper face to its lower face. Typically, the passage or passages may be provided in order to accommodate, in use, a control rod and/or to allow for cooling fluid to be passed therethrough. Typically, the first portion has a cooling fluid flow passage and the second portion has a control rod passage respectively passing therethrough.

In one embodiment of the invention, the second portion side faces may be planar. Alternatively, the second portion side faces may be curved, when the neutron reflector block is seen in plan view. In such a case, the second portion side faces may typically have a convex curvature and may extend deeper inwardly into the second portion toward the intermediate shoulders than toward the second end face. Thus, when the second portion has a control rod passage passing therethrough, the second portion side faces, when curved, would typically curve inwardly partially around the control rod passage in a direction towards the intermediate shoulders. In some cases, this may result in the intermediate shoulders extending deeper into the second portion than would be the case when the second portion side faces are planar.

The neutron reflector block may preferably be symmetrical about a plane intersecting it along a longitudinal midline of the operatively upper or lower face thereof. Additionally, the first and second portions may have equal thicknesses, i.e. interfacial distances between the operatively upper and operatively lower faces thereof. The operatively upper and operatively lower faces of the first portion and second portion would thus typically be flush with each other, thereby defining uniform operatively upper and lower faces of the reflector block.

The neutron reflector block may be of any suitable neutron reflective material. Preferably, the neutron reflector block is of graphite.

A recess may be defined in each of the sides of the second portion, adjacent each one of the intermediate shoulders. It will be appreciated that such slots would typically result in the shoulders extending deeper into the second portion than would be the case when the recesses are not defined. The recesses typically extend along the width of the second portion, opening out at the upper and lower faces thereof.

In use, a plurality of the neutron reflector blocks may be assembled side-by-side to form a reflector block assembly, typically with adjacent first portion side faces of adjacent reflector blocks being in abutment. Securing the reflector blocks in relation to each other in such an assembly may be achieved by means of key blocks, the key blocks being configured to be interposed complementally in spaces which are defined between adjacent second portion side faces of adjacent neutron reflector blocks. If appropriate, i.e. if the reflector blocks have recesses as hereinbefore described, the key blocks may typically have projections configured complementally to slot into the recesses.

Thus, in accordance with a second aspect of the invention, there is provided a neutron reflector block assembly, which includes a pair of the neutron reflector blocks in accordance with the first aspect of the invention and having recesses defined in second portion side faces thereof as hereinabove described, the reflector blocks abutting in side-by-side relationship such that adjacent first portion side faces of the reflector blocks abut each other with a space being defined between adjacent second portion side faces of the neutron reflector blocks; and a key block located in the space between the adjacent second portion side faces of the neutron reflector blocks and locking the neutron reflector blocks together.

The key block may have complemental projections which engage the recesses in the second portion side faces of the neutron reflector blocks. In particular, the key block may comprise a spacing portion and a securing portion, with the securing portion providing the complemental projections. The spacing portion may be shaped complementally to and may thus operatively fill the space between the second portion side faces of the neutron reflector blocks. Thus, when the second portion side faces are planar, corresponding side faces of the spacing portion of the key block may also be planar, in which case a profile of split between the spacing portion and the second portion would typically be straight. Similarly, when the second portion side faces are curved, the side faces of the spacing portion may have a complemental curvature in their plan view profile, in which case the profile of split between the spacing portion and the second portion would be curved.

Typically, in use, the assembly may include a plurality of abutting side-by-side arranged neutron reflector blocks and associated key blocks, with the neutron reflector blocks being arranged such that the assembly has a closed-shaped geometric outline with the first portion side face of a first neutron reflector block of the assembly and that of a last neutron reflector block of the assembly abutting each other and the key blocks connecting adjacent neutron reflector blocks to each other. It is expected that the assembly would typically have an isogonal polygonal or circular polygonal outline. It will be appreciated that the assembly may, depending on the configuration thereof, normally include an equal number of securing inserts to the number of reflector blocks employed in the assembly. In a preferred embodiment of the invention, the assembly has a generally annular profile, not necessarily being circular in outline, such that, in use, the assembly may be provided around a reactor core, typically as part of an annular side reflector for a nuclear reactor.

It will be appreciated that the reflector blocks and the securing inserts of the assembly, respectively, do not necessarily need to be identical. It is envisaged that the second portions of some of the reflector blocks in the assembly may project further from the intermediate face, i.e. operatively inwardly, than other reflector blocks in the assembly and that individual reflector blocks may also have different sized second end faces. In such a case, the reflector assembly may typically have a so-called checkerboard appearance with some reflector blocks protruding further inwardly than others. This may also apply to the spacing portions of the key blocks. An operatively inner face of the assembly may therefore be non-uniform. It is, however, expected that the first portions of the reflector blocks employed in the reactor would be substantially identical in size and shape so as to define a uniform operatively outer surface of the reflector block assembly. The diameter of control rod passages, typically being provided in the second portions of the blocks, may also differ.

The invention extends to a side reflector for a nuclear reactor, the side reflector including at least one neutron reflector block assembly according to the second aspect of the invention.

The invention also extends to a nuclear reactor having a side reflector including at least one neutron reflector block assembly according to the second aspect of the invention. The nuclear reactor may be a high temperature gas cooled nuclear reactor, typically of the pebble bed type.

The invention will now be described by way of example only with reference to the following diagrammatic drawings:

Figure 1:
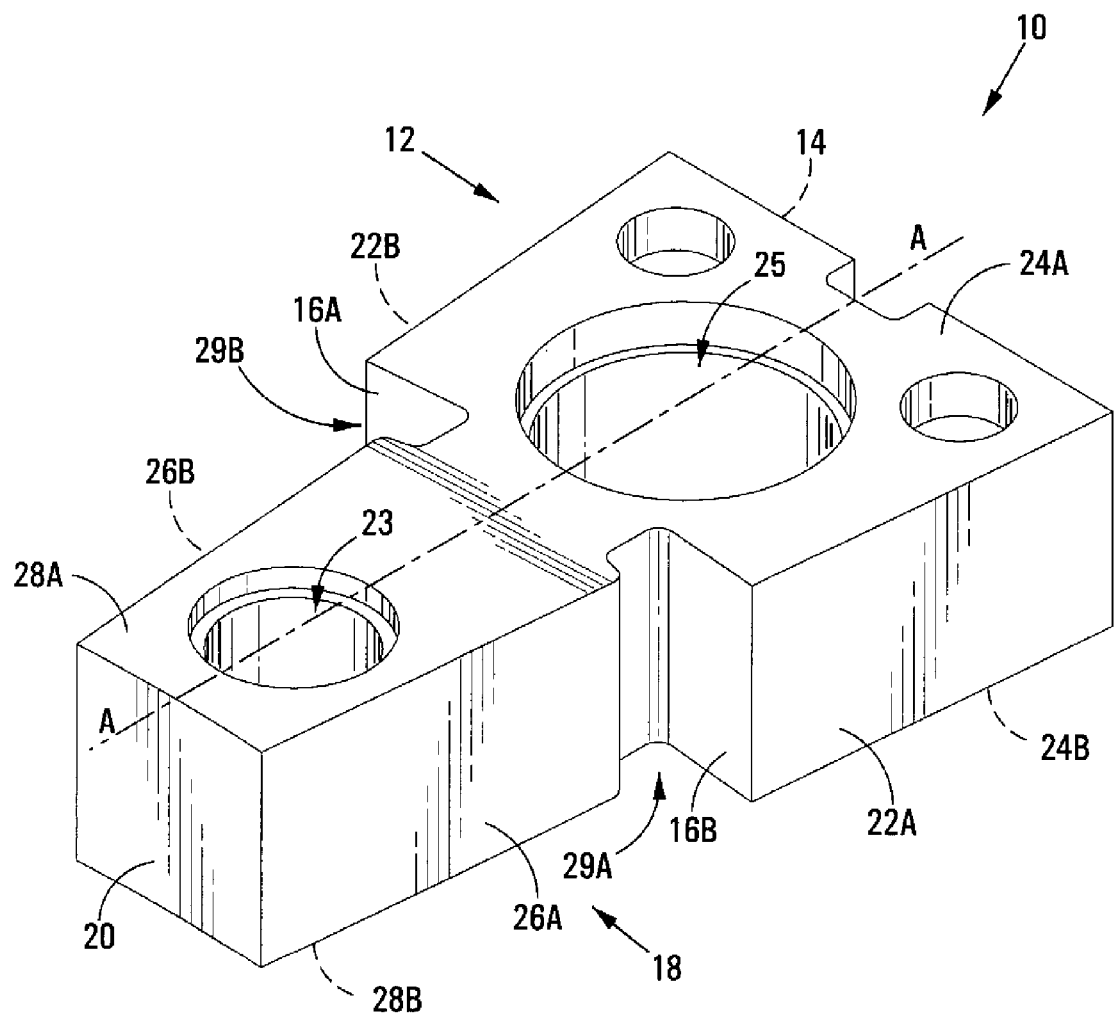
FIG. 1 shows a perspective view of a neutron reflector block in accordance with the invention.

Referring to the drawings and in particular to FIG. 1, reference numeral 10 generally indicates a reflector block in accordance with the invention.

The block 10 is of graphite.

The block 10 includes a first portion 12 having a first end face 14 and oppositely located intermediate shoulders 16A, 16B which are spaced from the first end face 14.

The block 10 further comprises a second portion 18 defining a second end face 20 which is located oppositely to the first end face 14. The second portion 18 protrudes from the first portion 12, from between the intermediate shoulders 16A, 16B.

The first end face 14 and the intermediate shoulders 16A, 16B are bounded by spaced first portion side faces 22A, 22B and spaced upper and lower first portion faces 24A, 24B. Similarly, the second end face 20 and the intermediate shoulders 16A, 16B are bounded by second portion side faces 26A, 26B and operatively upper and lower second portion faces 28A, 28B. It will be appreciated that the upper faces 24A, 28B and the lower faces 24B, 28B, respectively, are flush with each other, thus constituting continuous upper and lower faces of the neutron reflector block 10.

The second portion side faces 26A, 26B are more narrowly spaced relative to the first portion side faces 22A, 22B, such that the second portion 18 has a generally narrower lateral profile than the first portion 12.

Each of the intermediate shoulders 16A, 16B has an aperture 29A, 29B defined adjacent thereto at an interface 27 between the first and second portions 12, 18. The apertures 29A, 29B project into the second portion 18 and extend through to the upper and lower faces 28A, 28B thereof.

The neutron reflector block 10, and more particularly the first and second portions 12, 18 thereof, respectively, tapers in width from the first end face 14 to the second end face 20.

The first portion 12 has a cooling fluid passage 25 passing from the upper face 24A thereof through to the lower face 24B thereof. The second portion 18 has a control rod passage 23 passing from the upper face 28A thereof through to the lower face 28B thereof. The passage 23 may also, in some cases, function as a reserve shut down system passage.

It will be appreciated that the neutron reflector block 10 is symmetrical about a plane intersecting the block 10 along a longitudinal midline A-A of the upper face thereof.

Figure 2:
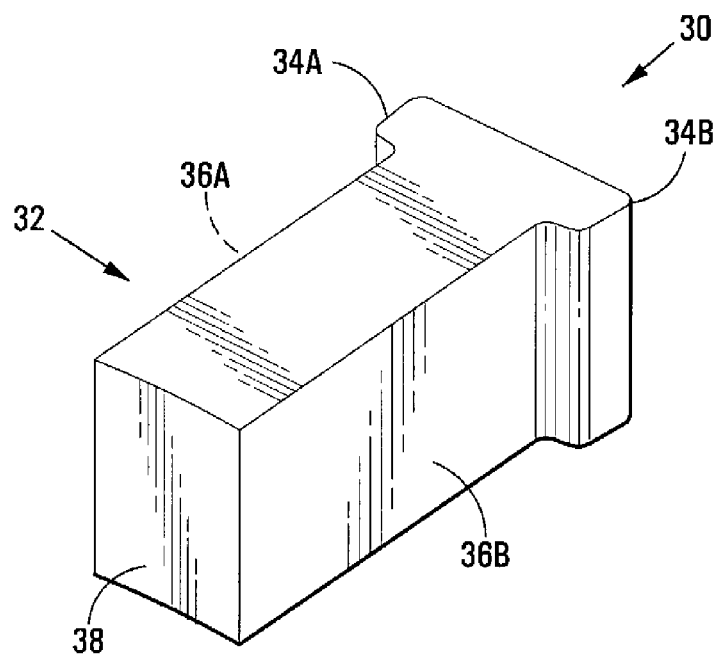
FIG. 2 shows a perspective view of a key block for use in a neutron reflector block assembly including a plurality of the neutron reflector blocks of FIG. 1.

Referring now to FIG. 2, reference numeral 30 generally indicates a securing insert, or key block, for securing at least two of the reflector blocks 10 of FIG. 1 relative to each other.

The securing insert 30 comprises a spacing portion 32 and a securing portion 34, the securing portion 34 having two laterally projecting flange portions 34A, 34B.

Figure 3:
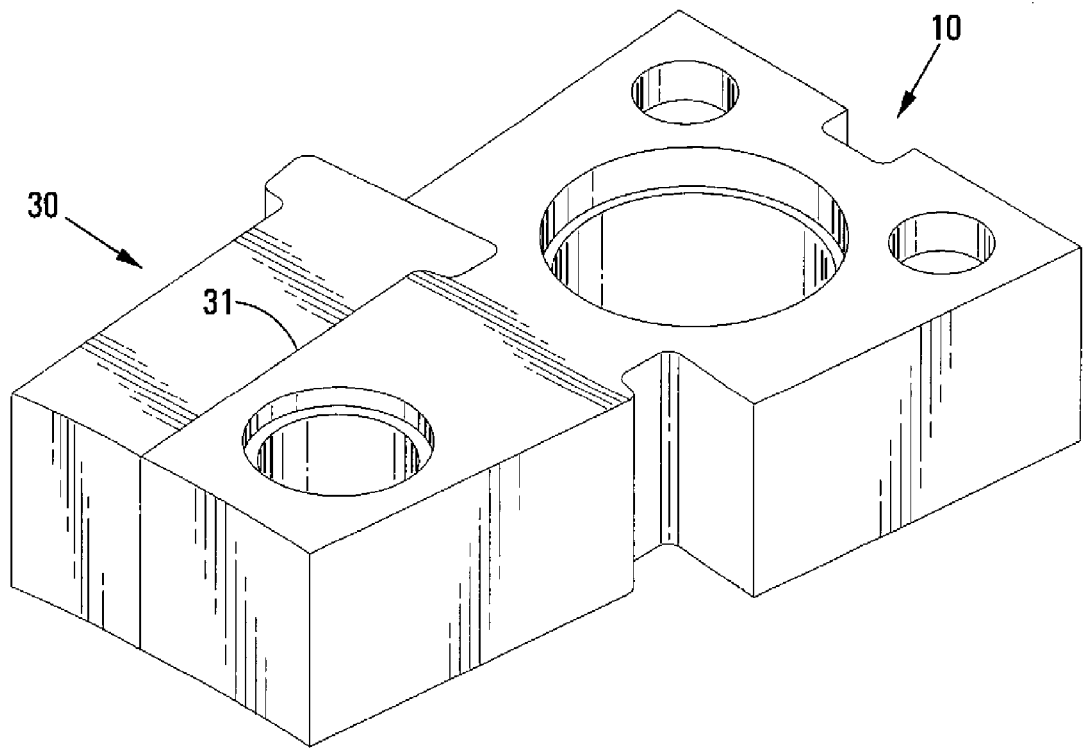
FIG. 3 shows a perspective view of the reflector block of FIG. 1 and the key block of FIG. 2 in a complementally engaged configuration.
Figure 4:
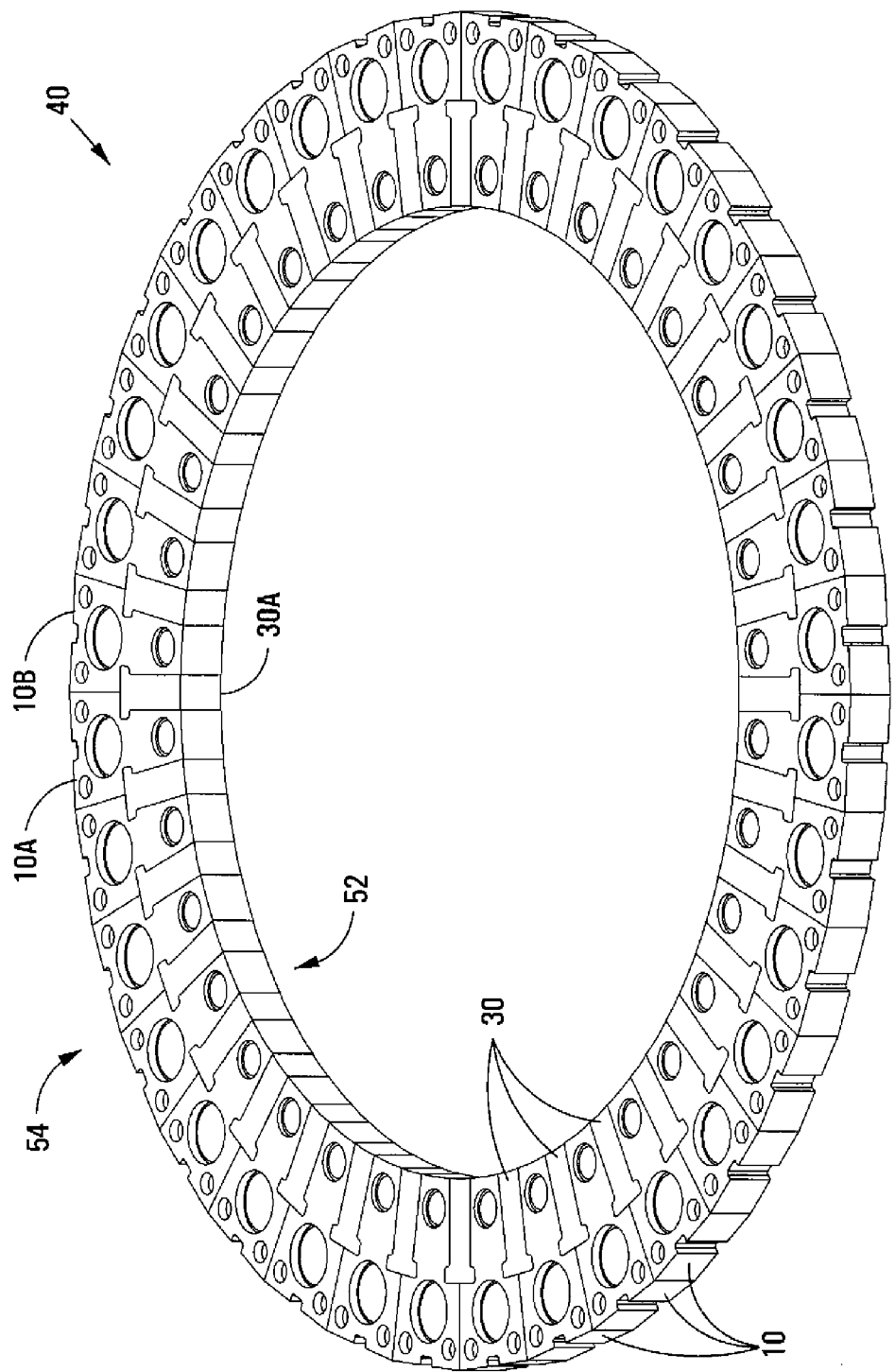
FIG. 4 shows a perspective view of a reflector block assembly in accordance with the invention.

The flange portions 34A, 34B are shaped complementally to the recesses 29A, 29B defined in the reflector block 10 of FIG. 1 and are therefore complementally receivable in respective recesses, as is more clearly illustrated in FIGS. 3 and 4.

The spacing portion 32 of the insert 30 is sized and shaped complementally to a space which is defined between adjacent side faces 26A/26B of the second portions 18 of adjacent reflector blocks 10. Thus, as is more clearly illustrated in FIG. 4, one side face 36A of the spacing portion of a particular securing insert 30A and a side face 26A of one neutron reflector block 10A are, in use, in abutment whilst the other side face 36B of the spacing portion 32 of the insert 30A is in abutment with the side face 26B of another neutron reflector block 10B located adjacent to the neutron reflector block 10A. The flange portions 34A, 34B are thus, in use, received in the recesses 29A, 29B of respective adjacently located neutron reflector blocks 10A, 10B respectively, thereby locking the neutron reflector blocks 10A, 10B together.

The insert 30 also has an operatively inner end face 38.

Figure 5:
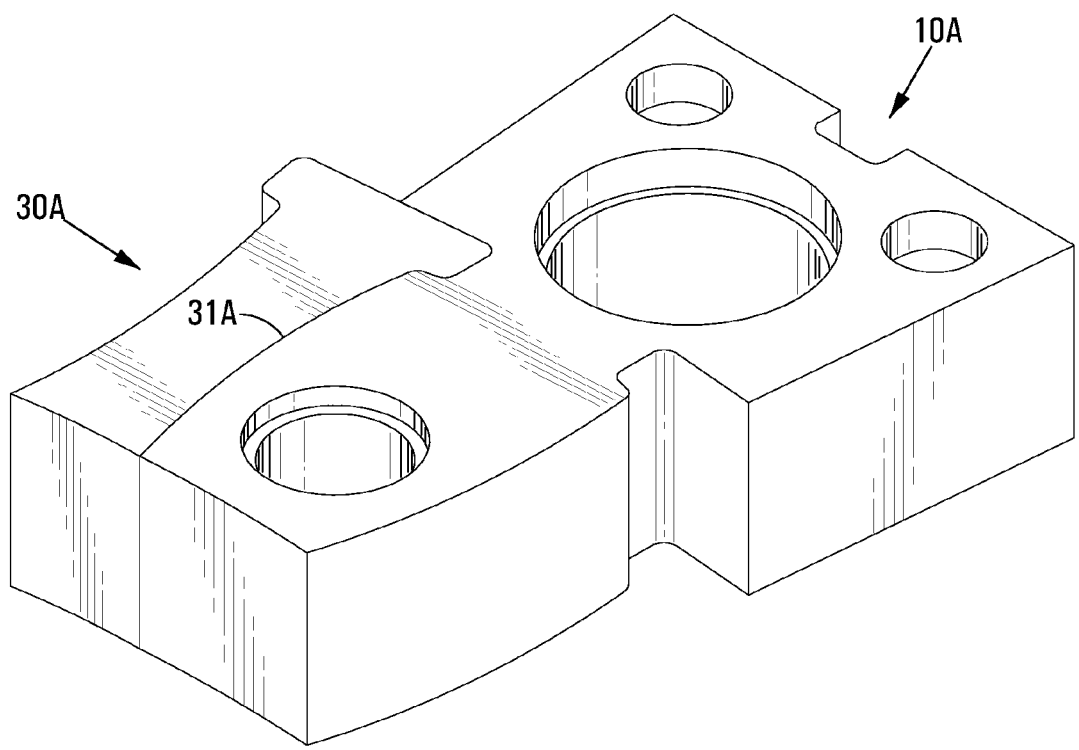
FIG. 5 shows a perspective view of a reflector block and a key block in a complementally engaged configuration in accordance with the invention.

FIG. 3 shows the block 10 of FIG. 1 and the insert 30 of FIG. 2 in a connected or assembled condition, with one side face 36B of the insert 30 being in abutment with one side face 26B of the neutron reflector block 10. The one flange potion 34B of the insert 30 is received in the one recess 29B of the neutron reflector block 10. It will be appreciated that a profile of split 31 between the side face 36B of the insert 30 and the side face 26B of the block 10 is straight as the abutting side faces 26B, 36B are both planar. In accordance with the invention, if the side faces 26A, 26B would have been curved, the side faces 36A, 36B would also have been curved complementally to the curvature of the side faces 26A, 26B respectively and would have resulted therein that the profile of split 31 would have been curved as well. Such an arrangement is illustrated in FIG. 5 with reference to alternative embodiments 10A, 30A of the reflector block 10 and the key block 30. A profile of split 31A between abutting side faces of the reflector block 10A and the keep lock 30A define a profile of split 31A that is curved, with second portion side faces of the reflector block 10A and side faces of the key block 30A being complementally curved.

In FIG. 4, reference numeral 40 generally indicates a side reflector block assembly in accordance with the invention. The side reflector block assembly 40 is suitable for inclusion in a side reflector of a high temperature gas cooled nuclear reactor, typically being employed in a stacked configuration with other, similar side reflector block assemblies making up the side reflector.

The assembly 40 includes a plurality of the reflector blocks 10 of FIG. 1 which are secured relative to each other by means of a plurality of the key blocks or securing inserts 30 of FIG. 2. It will be noted that an equal number of blocks 10 and inserts 30 are included in the assembly.

As indicated hereinbefore, it is envisaged that the neutron reflector blocks 10, in particular the second portions 18 thereof, may differ in size and shape, contrary to the illustrated embodiment in which all of the blocks 10 and inserts 30, respectively, are identical.

The blocks 10 are positioned in a side-by-side relationship with respective side faces 24A, 24B of the first portions 12 of adjacent reflector blocks 10 being in aligned connection or abutment with each other.

The securing inserts 30 are provided in spaces defined between the second portions 18 of adjacent neutron reflector blocks 10, with the flange portions 34A, 34B of each securing insert 30 being received in respective recesses 29A, 29B of adjacent reflector blocks 10.

It will be appreciated that the assembly 40 defines a closed-shape geometric arrangement, more particularly an isogonal polygon, sides of which are defined, on an inner surface 52 of the assembly, by the second end faces 20 of the second portions 18 of the blocks 10 and the operatively inner end faces of the inserts 30 and, on an outer surface 54 of the assembly, by first end faces 14 of the neutron reflector blocks 10.

It will be appreciated that, by providing a reflector block having first and second portions as hereinbefore described and by narrowing the second portion in relation to the first portion, also as hereinbefore described, the side reflector block comprises a smaller operatively inner or neutron incident portion and a larger operatively outer portion, which are connected to each other. The amount of graphite in the neutron incident portion, where the neutron flux is the highest, is therefore reduced. The Applicant regards it as a particular advantage of the invention as described that, by such a configuration, internal stresses in the neutron incident portion are reduced due to the reduced size of the incident portion without interrupting a heat flow path defined along the first and second portions. Thus, the Applicant regards the neutron reflector block of the present invention, and accordingly also a neutron reflector block assembly in accordance with the invention, as having reduced internal stress-generating properties and enhanced heat transfer properties in comparison to double-layered side reflector configurations as hereinbefore described. The internal stress-generating properties of the reflector block are therefore reduced whilst not compromising heat transfer properties of the neutron reflector block.

The Applicant further regards it as a particular advantage of the invention as described that the neutron reflector block and key block or securing insert according to the invention can be tailored to balance internal stress-generating properties thereof and minimize these properties.

The reduced stress-generating properties and resulting reduced stresses in the reflector block and reflector block assembly according to the invention lead to an improved margin of safety when operating a nuclear reactor in which they are employed.

The Applicant expects that the reflector block according to the invention will have an increased operating life in relation to existing reflector blocks.

The Applicant further regards it as a particular advantage of the invention that when the second portion side faces of the reflector block are curved and the corresponding side faces of an associated securing insert a key block is curved complementally, placing said faces against each other would define a curved profile of split between the second portion of the reflector block and spacing portion of the key block which would reduce neutron streaming in the split, as compared to the streaming which may occur when the profile of split is a straight line. In addition, a curved profile of split is expected to reduce leak-flow of gas between two adjacent blocks.

Extending the second faces of alternating blocks to create a checkerboard pattern will probably also serve to disrupt the packing of the pebble bed, thereby reducing the packing density of the fuel. A reduced packing density will possibly reduce the maximum contact force applied on and experienced by the fuel, and will also possibly reduce the resistance to flow of the pebble bed.

The invention claimed is:

1. A neutron reflector block assembly, which includes
a pair of neutron reflector blocks each of which comprises
a first portion having a first end face and oppositely located intermediate shoulders spaced from the first end face, the first end face and the intermediate shoulders being bounded by spaced side faces and spaced upper and lower faces;
a second portion, which protrudes from the first portion between the intermediate shoulders and has spaced side faces and spaced upper and lower faces, as well as a second end face located oppositely to the first end face, the second portion side faces being more narrowly spaced relative to the first portion side faces such that, when the neutron reflector block is, in use, arranged adjacent to and in a side-by-side relationship with another such neutron reflector block with adjacent first portion side faces of the neutron reflector blocks abutting each other, a space is defined between adjacent second portion side faces of the neutron reflector blocks; and
a recess defined in each of the sides of the second portions of the reflector blocks, adjacent each one of their respective intermediate shoulders,
the reflector blocks of the assembly abutting in side-by-side relationship such that their adjacent first portion side faces abut each other and the space is thus defined between their adjacent second portion side faces; and
a key block located in the space between the adjacent second portion side faces of the neutron reflector blocks and joining the neutron reflector blocks together,
wherein, with respect to the neutron reflector blocks respectively, each first portion side face is located in a first portion side face plane and each second portion side face is located in a second portion side face plane, with the second portion side face planes of the second portion side faces of the neutron reflector block being more narrowly spaced than first portion side face planes of the first portion side faces of the neutron reflector block, with the proviso that the first portion side face planes and second portion side face planes are not co-planar.

2. The neutron reflector block assembly according to claim 1, wherein, with respect to the neutron reflector blocks respectively, the first and second portions each tapers in width in a direction from the first end face toward the second end face.

3. The neutron reflector block assembly according to claim 1, wherein, with respect to the neutron reflector blocks respectively, at least one of the first and second portions has a passage passing therethrough from its upper face to its lower face.

4. The neutron reflector block assembly according to claim 1, wherein, with respect to the neutron reflector blocks respectively, the second portion side faces are planar.

5. The neutron reflector block assembly according to claim 1, wherein, with respect to the neutron reflector blocks respectively, the second portion side faces are curved, when the neutron reflector block is seen in plan view.

6. The neutron reflector block assembly according to claim 1, wherein the neutron reflector blocks are of graphite.

7. The neutron reflector block assembly according to claims 1, wherein the key block has complemental projections which engage the recesses in the sides of the neutron reflector blocks.

8. The neutron reflector block assembly according to claim 7, wherein the key block comprises a spacing portion and a securing portion, with the securing portion providing the complemental projections.

9. The neutron reflector block assembly according to or claim 8, wherein the spacing portion is shaped complementally to and thus operatively fills the space between the second portion side faces of the neutron reflector blocks.

10. The neutron reflector block assembly according to claim 1, which includes a plurality of abutting side-by-side arranged neutron reflector blocks and associated key blocks, the neutron reflector blocks being arranged such that the assembly has a closed-shaped geometric outline with the first portion side face of a first neutron reflector block of the assembly and that of a last neutron reflector block of the assembly abutting each other and the key blocks connecting adjacent neutron reflector blocks to each other.

11. A side reflector for a nuclear reactor, the side reflector including at least one neutron reflector block assembly according to claim 1.

12. A nuclear reactor having a side reflector which includes at least one neutron reflector block assembly according to claim 1.

13. The nuclear reactor according to claim 12 which is a high temperature gas-cooled nuclear reactor.

14. A neutron reflector block assembly, which includes a pair of neutron reflector blocks each of which comprises:
a first portion having a first end face and oppositely located intermediate shoulders spaced from the first end face, the first end face and the intermediate shoulders being bounded by spaced side faces and spaced upper and lower faces;
a second portion, which protrudes from the first portion between the intermediate shoulders and has spaced side faces and spaced upper and lower faces, as well as a second end face located oppositely to the first end face, the second portion side faces being more narrowly spaced relative to the first portion side faces such that, when the neutron reflector block is, in use, arranged adjacent to and in a side-by-side relationship with another such neutron reflector block with adjacent first portion side faces of the neutron reflector blocks abutting each other, a space is defined between adjacent second portion side faces of the neutron reflector blocks; and a recess defined in each of the sides of the second portions of the reflector blocks, adjacent each one of their respective intermediate shoulders, the reflector blocks of the assembly abutting in side-by-side relationship such that their adjacent first portion side faces abut each other and the space is thus defined between their adjacent second portion side faces; and a key block located in the space between the adjacent second portion side faces of the neutron reflector blocks and joining the neutron reflector blocks together, wherein, with respect to the neutron reflector blocks respectively, the second portion side faces are curved, when the neutron reflector block is seen in plan view.

15. The neutron reflector block assembly according to claim 14, wherein, with respect to the neutron reflector blocks respectively, the first and second portions each tapers in width in a direction from the first end face toward the second end face.

16. The neutron reflector block assembly according to claim 14, wherein, with respect to the neutron reflector blocks respectively, at least one of the first and second portions has a passage passing therethrough from its upper face to its lower face.

17. The neutron reflector block assembly according to claim 14, wherein the neutron reflector blocks are formed of graphite.

18. The neutron reflector block assembly according to claim 14, wherein the key block has complemental projections which engage the recesses in the sides of the neutron reflector blocks.

19. The neutron reflector block assembly according to claim 18, wherein the key block comprises a spacing portion and a securing portion, with the securing portion providing the complemental projections.

20. The neutron reflector block assembly according to claim 19, wherein the spacing portion is shaped complementally to and thus operatively fills the space between the second portion side faces of the neutron reflector blocks.

21. The neutron reflector block assembly according to claim 14, which includes a plurality of abutting side-by-side arranged neutron reflector blocks and associated key blocks, the neutron reflector blocks being arranged such that the assembly has a closed-shaped geometric outline with the first portion side face of a first neutron reflector block of the assembly and that of a last neutron reflector block of the assembly abutting each other and the key blocks connecting adjacent neutron reflector blocks to each other.

22. A side reflector for a nuclear reactor, the side reflector including at least one neutron reflector block assembly according to claim 14.

23. A nuclear reactor having a side reflector which includes at least one neutron reflector block assembly according to claim 14.

* * * * *